US008666748B2

(12) United States Patent
Dong et al.

(10) Patent No.: US 8,666,748 B2
(45) Date of Patent: Mar. 4, 2014

(54) METHODS AND SYSTEMS FOR COMMUNICATING AUDIO CAPTURED ONBOARD AN AIRCRAFT

(75) Inventors: Xian Qin Dong, Beijing (CN); Ben Dong, Beijing (CN); Yunsong Gao, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 145 days.

(21) Appl. No.: 13/331,365

(22) Filed: Dec. 20, 2011

(65) Prior Publication Data

US 2013/0158991 A1 Jun. 20, 2013

(51) Int. Cl.
G10L 25/00 (2013.01)
G10L 21/00 (2013.01)

(52) U.S. Cl.
USPC .................. 704/270; 704/270.1; 704/275

(58) Field of Classification Search
USPC .................................... 704/270–275
See application file for complete search history.

(56) References Cited

U.S. PATENT DOCUMENTS

| | | | |
|---|---|---|---|
| 4,624,008 A * | 11/1986 | Vensko et al. ................ | 704/253 |
| 4,725,956 A | 2/1988 | Jenkins | |
| 5,844,503 A | 12/1998 | Riley et al. | |
| 6,128,594 A | 10/2000 | Gulli et al. | |
| 6,182,039 B1 | 1/2001 | Rigazio et al. | |
| 6,346,892 B1 | 2/2002 | DeMers et al. | |
| 6,370,457 B1 | 4/2002 | Nemeth | |
| 6,430,488 B1 * | 8/2002 | Goldman et al. ............... | 701/36 |
| 6,697,716 B2 | 2/2004 | Horst | |
| 6,859,773 B2 | 2/2005 | Breton | |
| 6,985,852 B2 | 1/2006 | Wang | |
| 7,089,108 B2 | 8/2006 | Merritt | |
| 7,113,109 B2 | 9/2006 | Cordina et al. | |
| 7,174,300 B2 | 2/2007 | Bush | |
| 7,289,890 B2 | 10/2007 | Mitchell et al. | |
| 7,415,326 B2 | 8/2008 | Komer et al. | |
| 7,436,322 B2 | 10/2008 | Crank | |
| 7,496,511 B2 | 2/2009 | Vora | |
| 7,555,431 B2 | 6/2009 | Bennett | |
| 7,580,377 B2 | 8/2009 | Judd | |
| 7,606,715 B1 | 10/2009 | Krenz | |
| 7,627,638 B1 * | 12/2009 | Cohen .......................... | 709/206 |
| 7,853,295 B1 * | 12/2010 | Fujisaki ....................... | 455/566 |
| 7,913,569 B2 * | 3/2011 | Girshovich et al. ............. | 73/779 |
| 2001/0047267 A1 * | 11/2001 | Abiko et al. .................. | 704/500 |
| 2002/0022954 A1 * | 2/2002 | Shimohata et al. ............... | 704/3 |
| 2002/0035471 A1 * | 3/2002 | Breton ......................... | 704/233 |
| 2002/0087319 A1 | 7/2002 | Stephenson | |
| 2002/0093564 A1 * | 7/2002 | Israel .......................... | 348/145 |
| 2002/0107694 A1 | 8/2002 | Lerg | |
| 2003/0025682 A1 | 2/2003 | Dame | |

(Continued)

OTHER PUBLICATIONS

EP Search Report, EP 10187078.0-2225 dated Mar. 15, 2011.

(Continued)

Primary Examiner — Eric Yen
(74) Attorney, Agent, or Firm — Fogg & Powers LLC

(57) ABSTRACT

Methods and systems are provided for communicating information from an aircraft to a computer system at a ground location. One exemplary method involves obtaining an audio input from an audio input device onboard the aircraft, generating text data comprising a textual representation of the one or more words of the audio input, and communicating the text data to the computer system at the ground location.

17 Claims, 3 Drawing Sheets

(56) References Cited

U.S. PATENT DOCUMENTS

| | | |
|---|---|---|
| 2003/0225492 A1 | 12/2003 | Cope et al. |
| 2004/0027255 A1 | 2/2004 | Greenbaum |
| 2004/0124998 A1 | 7/2004 | Dame |
| 2004/0128039 A1* | 7/2004 | Podowski .................. 701/35 |
| 2004/0138882 A1 | 7/2004 | Miyazawa |
| 2005/0089003 A1* | 4/2005 | Proctor et al. ............... 370/342 |
| 2005/0114140 A1 | 5/2005 | Brackett et al. |
| 2005/0203700 A1 | 9/2005 | Merritt |
| 2005/0228674 A1 | 10/2005 | Gunn et al. |
| 2007/0288128 A1 | 12/2007 | Komer et al. |
| 2008/0045198 A1 | 2/2008 | Bhogal et al. |
| 2009/0145239 A1* | 6/2009 | Girshovich et al. ............ 73/779 |
| 2009/0325131 A1* | 12/2009 | Cernasov et al. ............... 434/30 |
| 2010/0027768 A1* | 2/2010 | Foskett .................... 379/88.14 |
| 2010/0076644 A1 | 3/2010 | Cahill et al. |
| 2010/0161339 A1 | 6/2010 | DeMers et al. |
| 2011/0149849 A1* | 6/2011 | Brownrig ..................... 370/328 |
| 2011/0282522 A1 | 11/2011 | Prus et al. |

OTHER PUBLICATIONS

European Patent Office, "Office Action", "from Foreign Counterpart of U.S. Appl. No. 13/331,365", May 28, 2013, pp. 1-6, Published in: EP.

European Patent Office, "European Search Report", "from Foreign Counterpart of U.S. Appl. No. 13/331,365", May 14, 2013, pp. 1-3, Published in: EP.

* cited by examiner

| | | | |
|---|---|---|---|
| $t_0$ | text_data_0 | aircraft_location_0 | aircraft_altitude_0 | aircraft_orientation_0 |
| $t_1$ | text_data_1 | aircraft_location_1 | aircraft_altitude_1 | aircraft_orientation_1 |
| $t_2$ | text_data_2 | aircraft_location_2 | aircraft_altitude_2 | aircraft_orientation_2 |
| $t_3$ | text_data_3 | aircraft_location_3 | aircraft_altitude_3 | aircraft_orientation_3 |
| . | . | . | . | . |
| . | . | . | . | . |
| . | . | . | . | . |
| $t_N$ | text_data_N | aircraft_location_N | aircraft_altitude_N | aircraft_orientation_N |

FIG. 3

| | | | |
|---|---|---|---|
| $t_{N+1}$ | text_data_N+1 | aircraft_location_N+1 | aircraft_altitude_N+1 | aircraft_orientation_N+1 |
| $t_0$ | text_data_0 | aircraft_location_0 | aircraft_altitude_0 | aircraft_orientation_0 |
| $t_1$ | text_data_1 | aircraft_location_1 | aircraft_altitude_1 | aircraft_orientation_1 |
| $t_2$ | text_data_2 | aircraft_location_2 | aircraft_altitude_2 | aircraft_orientation_2 |
| $t_3$ | text_data_3 | aircraft_location_3 | aircraft_altitude_3 | aircraft_orientation_3 |
| . | . | . | . | . |
| . | . | . | . | . |
| . | . | . | . | . |
| $t_N$ | text_data_N | aircraft_location_N | aircraft_altitude_N | aircraft_orientation_N |

FIG. 4

METHODS AND SYSTEMS FOR COMMUNICATING AUDIO CAPTURED ONBOARD AN AIRCRAFT

TECHNICAL FIELD

The subject matter described herein relates generally to avionics systems, and more particularly, embodiments of the subject matter relate to communicating audio captured onboard an aircraft to a ground location.

BACKGROUND

Traditionally, there are two types of flight recorders installed in an aircraft: a flight data recorder (FDR) and a cockpit voice recorder (CVR). The CVR records audio information using one or more microphones located onboard the aircraft (e.g., on pilot headsets or other locations in the cockpit). The recorded cockpit audio provides insight into operation of the aircraft for subsequent investigation and analysis. However, in practice, there are situations where the FDR and/or the CVR cannot be readily located (e.g., in remote areas, open ocean, or when locator beacons become separated from the recorders). While it is technically possible to transmit flight data and/or audio data from the aircraft to ground locations continuously in real-time, the relatively high cost (e.g., memory and/or bandwidth requirements) for transmitting and/or storing the audio and flight data for all of the flight hours across an entire fleet of operating aircraft effectively makes such approaches economically infeasible for aircraft operators, even when data compression techniques are employed.

BRIEF SUMMARY

Methods are provided for communicating information from an aircraft to a computer system at a ground location. One exemplary method involves obtaining an audio input from an audio input device onboard the aircraft, generating text data comprising a textual representation of the one or more words of the audio input, and communicating the text data to the computer system at the ground location.

In another embodiment, a system suitable for use with an aircraft is provided. The system includes an audio input device onboard the aircraft to receive an audio input comprising one or more words, a processing system coupled to the audio input device to generate text data representative of the one or more words, and a communications system coupled to the processing system to communicate the text data from the aircraft to a ground location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and:

FIGS. 3-4 depict graphical representations of an exemplary ordered data structure suitable for use with the cockpit voice communication process of FIG. 2 in accordance with one or more embodiments.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to systems and methods for communicating audio information captured onboard an aircraft to a computer system on the ground. In an exemplary embodiment, audio signals captured by audio input devices located in the cockpit or other locations onboard the aircraft are converted to text using speech recognition techniques and stored onboard the aircraft as text data. Additionally, concurrent flight data is obtained from one or more onboard avionics systems and stored in association with the text data. In an exemplary embodiment, the text and flight data are arranged or otherwise stored in a time ordered sequence in an ordered data structure, such as a circular buffer. In this regard, when the data structure is full, the oldest text and flight data are deleted, removed, or otherwise overwritten by the most recently obtained text and flight data, such that the data structure maintains the more recent text and flight data in arranged with a first in, first out ordering. In response to a transmission triggering event, such as a warning issued by an onboard avionics system or a manual request for transmission (e.g., by a pilot, a co-pilot, another crew member, or ground personnel), the stored text and flight data are automatically transmitted (i.e., without or otherwise independent of any manual input or other manual intervention) in accordance with the time ordered sequence from the aircraft to a computer system on the ground, where the text and flight data may be stored separate from the aircraft. The text and flight data may subsequently be displayed on a display device associated with the computer system, thereby allowing ground personnel to review the textual representation of the audio captured onboard the aircraft along with its associated flight data in accordance with the time ordered sequence. In this manner, the ground personnel may review the captured audio and its associated operational context independently of the flight data recorder (FDR) and/or the cockpit voice recorder (CVR) onboard the aircraft.

Figure 1:
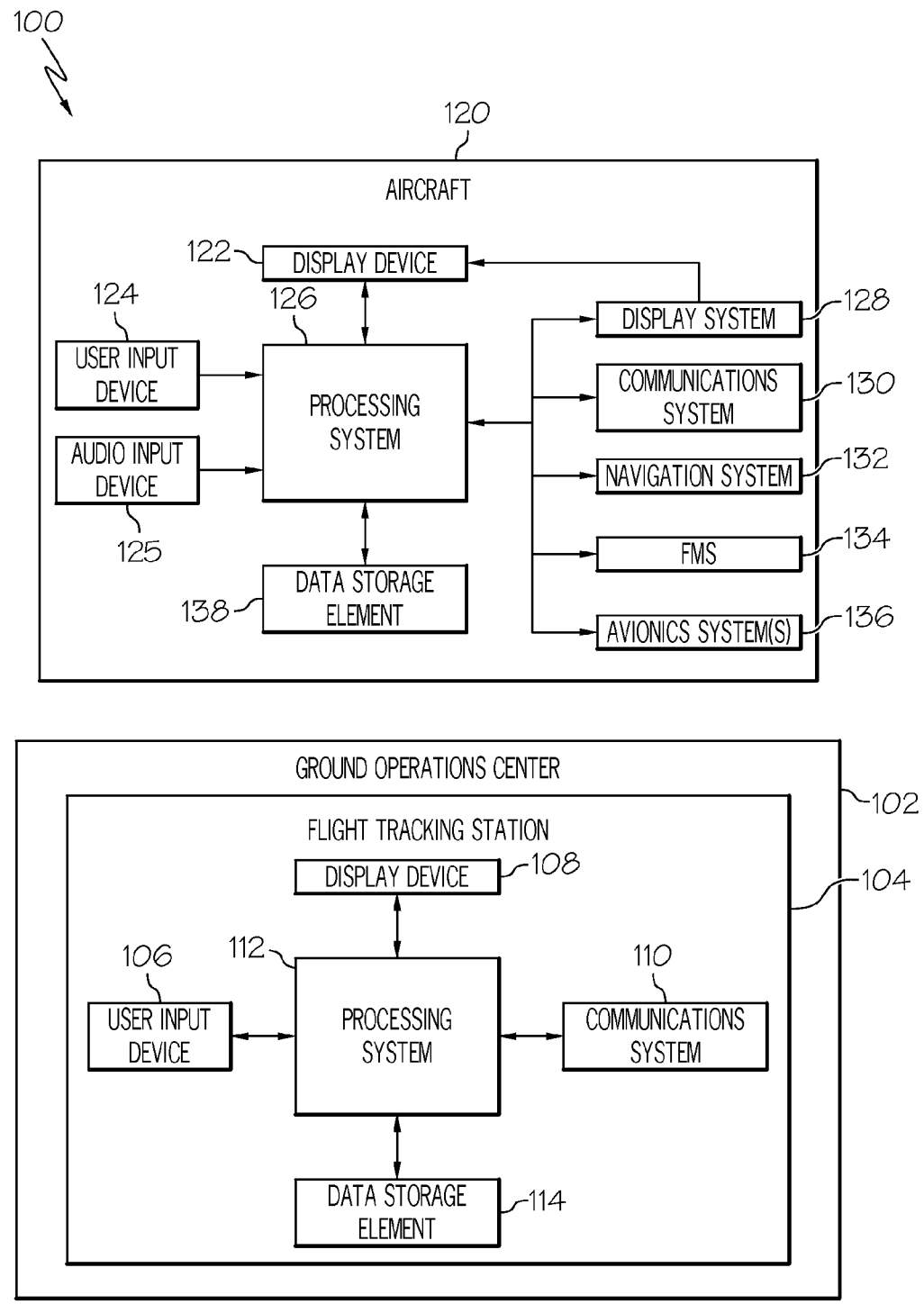
FIG. 1 is a block diagram of a flight tracking system suitable for use with an aircraft in accordance with one embodiment.

FIG. 1 depicts an exemplary embodiment of a flight tracking system 100 for communicating data and/or information from an aircraft 120 to a computer system at a ground location, such as a flight tracking station 104 at a ground operations center 102. As described in greater detail below, audio signals captured by an audio input device 125 onboard the aircraft 120 are converted to text and stored or otherwise recorded as text data using speech recognition techniques and stored onboard the aircraft as text data. In response to a transmission triggering event, the text data is automatically transmitted from the aircraft 120 the flight tracking station 104 for storage and/or review at the ground operations center 102.

The illustrated embodiment of the aircraft 120 includes, without limitation, a display device 122, a user input device 124, the audio input device 125, a processing system 126, a display system 128, a communications system 130, a navigation system 132, a flight management system (FMS) 134, one or more additional avionics systems 136, and a data storage element 138 suitably configured to support operation of the flight tracking system 100 in accordance with a cockpit voice communication process described in greater detail below. The display device 122 is realized as an electronic display capable of graphically displaying flight information or other data associated with operation of the aircraft 120 under control of the display system 128 and/or processing system 126. The display system 128 generally represents the hardware, software, and/or firmware components configured to display, render, or otherwise convey one or more graphical representations or images associated with operation of the aircraft 120 and/or avionics systems 130, 132, 134, 136 on the display device 122, such as, for example, navigational map displays, synthetic vision and/or enhanced visions displays, and the like. In this regard, the display system 128 may access or include one or more databases suitably configured to support operations of the display system 128, such as, for example, a terrain database, an obstacle database, a navigational database, a geopolitical database, a terminal airspace database, a special use airspace database, or other information for rendering and/or displaying navigational maps and/or other content on the display device 122. The user input device 124 is coupled to the processing system 126, and the user input device 124 and the processing system 126 are cooperatively configured to allow a user (e.g., a pilot, co-pilot, or crew member) to interact with the display device 122 and/or other elements onboard the aircraft 120. Depending on the embodiment, the user input device 124 may be realized as a push button, switch, keypad, touchpad, keyboard, mouse, touch panel (or touchscreen), joystick, knob, line select key or another suitable device adapted to receive input from a user.

In addition to the user input device 124, one or more audio input devices 125 are also located onboard the aircraft 120. The audio input device 125 may be realized as a microphone, audio transducer, audio sensor, or the like, that is located onboard the aircraft 120 and capable of sensing or otherwise receiving audio signals within the cockpit and/or cabin of the aircraft 120. In an exemplary embodiment, the aircraft 120 includes at least on audio input device 125 located inside the cockpit of the aircraft 120. For example, the audio input device 125 may be a microphone integrated with a headset worn by a pilot and/or co-pilot of the aircraft 120.

In the illustrated embodiment, the processing system 126 generally represents the hardware, software, and/or firmware components configured to support storing or otherwise recording audio captured by the audio input device(s) 125 as text data along with flight data and/or information received from one or more of the avionics systems 128, 130, 132, 134, 136 onboard the aircraft 120, communicating the recorded data and/or information to the flight tracking station 104 at the ground operations center 102, and perform additional tasks and/or functions to support operation of the flight tracking system 100, as described in greater detail below. In exemplary embodiments, the processing system 126 implements a speech recognition engine (or voice recognition engine) and/or speech-to-text system adapted to receive audio input from the audio input device(s) 125 and convert the audio input into a corresponding textual representation, as described in greater detail below. In this regard, the processing system 126 may also include various filters, analog-to-digital converters (ADCs), and the like, which are suitably configured to support converting or otherwise resolving audio signals received via the audio input device(s) 125 into textual representations thereof. In an exemplary embodiment, the processing system 126 includes or otherwise accesses a memory that maintains one or more acoustic noise models for the aircraft 120 which are used for resolving audio input from the audio input device(s) 125. For example, each acoustic noise model may correspond to the auditory (or audible) ambient noise (or background noise) proximate to the audio input device 125 during a respective operating state and/or flight phase for the aircraft 120, that is, the ambient noise and/or background noise which would be received by the audio input device 125 during the a particular operating state and/or flight phase. In this regard, each operating state and/or flight phase may be associated with an acoustic noise model that reflects the characteristics and/or patterns (e.g., volume or sound pressure level, frequencies, and the like) of the noise that would be sensed or otherwise received by the audio input device 125 during that respective operating state and/or flight phase. The noise models are utilized by the processing system 126 to construct a digital filter corresponding to the current flight phase and/or operating state of the aircraft 120 that is applied to the received audio input signals obtained from the audio input device 125, as described in greater detail below. Additionally, the processing system 126 accesses or otherwise includes a speech recognition vocabulary (or dictionary) that reflects aerospace grammar conventions (e.g., a vocabulary that includes frequently used aviation acronyms, terms and phrases, navigation terminology, aviation codes, instrument names and/or identifiers, flight operation manual terminology, checklist terminology, audio alters, and the like), which is utilized by the speech recognition engine implemented by the processing system 126.

As described in greater detail below, in an exemplary embodiment, the processing system 126 is coupled to the data storage element 138, which stores or otherwise maintains the text data (e.g., the textual representations of the content of the analog audio signals received via the audio input device 125) that is generated by the processing system 126. In an exemplary embodiment, the processing system 126 and the data storage element 138 are cooperatively configured to store the text data in an ordered data structure, such as a circular buffer, in a time ordered sequence. In this regard, once the allocated portion of the data storage element 138 for the circular buffer is fully utilized, the processing system 126 updates the text data maintained in the data storage element 138 by overwriting the oldest text data with the most recently generated text data. In this manner, the contents of the text data maintained by the data storage element 138 correspond to the most recent subset of audio content received via the audio input device(s) 125 while the text data representative of older audio content is overwritten and/or deleted. In an exemplary embodiment, the data storage element 138 is capable of storing at least ten minutes of text data and associated flight data. The data storage element 138 may be physically realized using RAM memory, ROM memory, flash memory, registers, a hard disk, or another suitable data storage medium known in the art or any suitable combination thereof.

Depending on the embodiment, the processing system 126 may include or otherwise be realized as a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 126 includes processing logic that may be configured to carry out the functions, techniques, and processing tasks associated with the operation of the flight tracking system 100 described in greater detail below. Furthermore, the steps of a method or algorithm described in connection with the embodiments disclosed herein may be embodied directly in hardware, in firmware, in a software module executed by the processing system 126, or in any practical combination thereof. In accordance with one or more embodiments, the processing system 126 includes or otherwise accesses a memory or another suitable non-transitory short or long term storage media capable of storing computer-executable programming instructions or other data for execution that, when read and executed by the processing system 126, cause the processing system 126 to execute and perform one or more of the processes tasks, operations, and/or functions described herein.

Still referring to FIG. 1, in an exemplary embodiment, the processing system 126 is coupled to the navigation system 132, which is configured to provide real-time navigational data and/or information regarding operation of the aircraft 120. The navigation system 132 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 132, as will be appreciated in the art. The navigation system 132 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 132 is also capable of obtaining or otherwise determining the heading of the aircraft 120 (i.e., the direction the aircraft is traveling in relative to some reference).

As illustrated in FIG. 1, the processing system 126 is also coupled to the communications system 130, which is configured to support communications to and/or from the aircraft 120. For example, the communications system 130 may support communications between the aircraft 120 and one or more ground locations, such as the ground operations center 102, air traffic control, and/or another suitable command center or ground location. In this regard, the communications system 130 may be realized using a radio communication system or another suitable data link system.

In an exemplary embodiment, the processing system 126 is also coupled to the FMS 134, which is coupled to the navigation system 132, the communications system 130, and one or more additional avionics systems 136 to support navigation, flight planning, and other aircraft control functions in a conventional manner, as well as to provide real-time data and/or information regarding the operational status of the aircraft 120 to the processing system 126. It should be noted that although FIG. 1 depicts a single avionics system 136, in practice, the flight tracking system 100 and/or aircraft 120 will likely include numerous avionics systems for obtaining and/or providing real-time flight-related information that may be displayed on the display device 122 or otherwise provided to a user (e.g., a pilot, a co-pilot, or crew member). For example, practical embodiments of the flight tracking system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, a stall warning system, a stick shaker, an electronic flight bag and/or another suitable avionics system.

In the illustrated embodiment of FIG. 1, the ground operations center 102 generally represents a facility located on the ground that includes one or more flight tracking stations 104 equipped to track, analyze, and otherwise monitor operations of one or more aircraft 120. In this regard, the flight tracking station 104 generally represents a computer or other computing system at the ground operations center 102 that may be operated by ground personnel to monitor, track and/or analyze the flight of the aircraft 120. In an exemplary embodiment, the flight tracking station 104 includes a user input device 106, a display device 108, a communications system 110, a processing system 112, and a data storage element 114. In exemplary embodiments, the display device 108 is realized as an electronic display coupled to the processing system 112 that is capable of graphically displaying text data and flight data received from the aircraft 120 under control of the processing system 112, as described in greater detail below. Depending on the embodiment, the user input device 106 may be realized as a keypad, touchpad, keyboard, mouse, touch panel (or touchscreen), joystick, knob, line select key or another suitable device adapted to receive input from a user, such as an audio input device, such as a microphone, audio transducer, audio sensor, or the like. The communications system 110 generally represents the combination of hardware, software, firmware and/or other components configured to support communications between the flight tracking station 104 and the aircraft 120 (e.g., via communications system 130), such as, for example, using data link avionics, a data link infrastructure, and/or a data link service provider.

The processing system 112 generally represents the hardware, software, and/or firmware components configured to receive or otherwise obtain the text data and flight data from the aircraft 120 (e.g., via communications systems 110, 130), store the text data and flight data received from the aircraft 120 in data storage element 114, and render or otherwise display a graphical representations of the received text data and flight data on the display device 108. Depending on the embodiment, the processing system 112 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

It should be understood that FIG. 1 is a simplified representation of the flight tracking system 100 for purposes of explanation and ease of description, and FIG. 1 is not intended to limit the application or scope of the subject matter described herein in any way. For example, in some embodiments, the display device 122, the user input device 124, the audio input device 125, and/or the processing system 126 may be implemented as an electronic flight bag that is physically separate from the aircraft 120 but capable of being communicatively coupled to the other elements of the aircraft 120 when onboard the aircraft 120. Furthermore, practical embodiments of the flight tracking system 100 and/or aircraft 120 will include numerous other devices and components for providing additional functions and features, as will be appreciated in the art. In this regard, it will be appreciated that although FIG. 1 shows a single display device 122, in practice, additional display devices may be present onboard the aircraft 120. Additionally, it should be noted that in other embodiments, features and/or functionality of processing system 126 described herein can be implemented by or otherwise integrated with the features and/or functionality provided by another element onboard the aircraft 120, such as, for example, the FMS 134 or another avionics system 136. That is, the processing system 126 may be a component of the FMS 134 or another avionics system 136.

Figure 2:
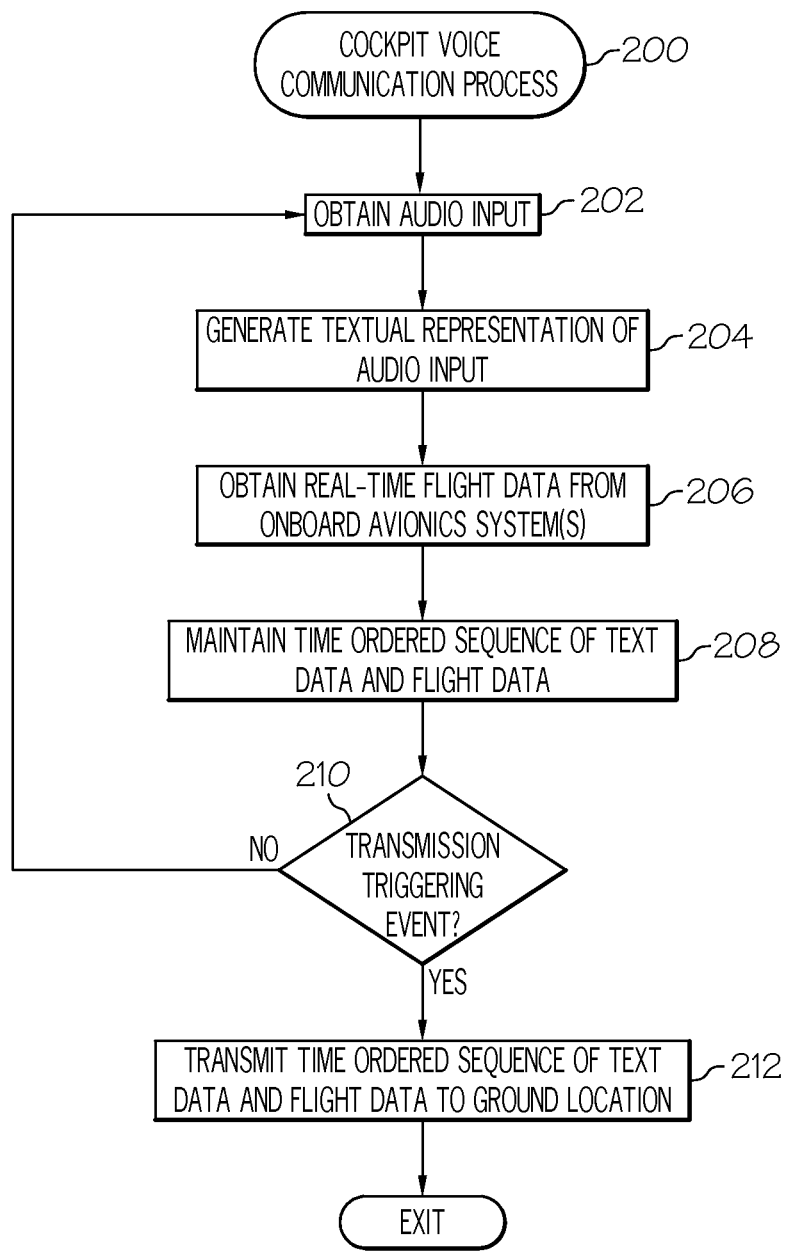
FIG. 2 is a flow diagram of an exemplary cockpit voice communication process suitable for use with the flight tracking system of FIG. 1 in accordance with one or more embodiments.

Referring now to FIG. 2, in an exemplary embodiment, the flight tracking system 100 is configured to perform a cockpit voice communication process 200 and additional tasks, functions, and operations described below. The various tasks performed in connection with the illustrated process 200 may be performed by software, hardware, firmware, or any combination thereof. For illustrative purposes, the following description may refer to elements mentioned above in connection with FIG. 1. In practice, portions of the cockpit voice communication process 200 may be performed by different elements of the flight tracking system 100, such as, the audio input device 125, the processing system 126, the communications system 130, the navigation system 132, the FMS 134, and/or the avionics system(s) 136. It should be appreciated that the cockpit voice communication process 200 may include any number of additional or alternative tasks, the tasks need not be performed in the illustrated order and/or the tasks may be performed concurrently, and/or the cockpit voice communication process 200 may be incorporated into a more comprehensive procedure or process having additional functionality not described in detail herein. Moreover, one or more of the tasks shown and described in the context of FIG. 2 could be omitted from a practical embodiment of the cockpit voice communication process 200 as long as the intended overall functionality remains intact.

Still referring to FIG. 2, and with continued reference to FIG. 1, in an exemplary embodiment, the cockpit voice communication process 200 begins by receiving or otherwise obtaining audio input from one or more audio input devices onboard the aircraft (task 202). In this regard, an audio input device 125 onboard the aircraft 120 receives or otherwise senses sounds or other audible information and converts those sounds to a corresponding electrical signal (i.e., an audio signal) that is provided to the processing system 126. In an exemplary embodiment, the audio input device 125 generates an analog audio signal in response to receiving or otherwise sensing a sound and provides the analog audio signal to the processing system 126.

In an exemplary embodiment, the cockpit voice communication process 200 continues by generating a textual representation of the audio input obtained from the audio input device(s) onboard the aircraft (task 204). In this regard, the processing system 126 converts analog audio signals received via the audio input device(s) 125 into digital data that represents the speech (or voice) content of the analog audio signal in text form. For example, in accordance with one or more embodiments, the processing system 126 identifies or otherwise determines the current flight phase (or operating state) of the aircraft 120, obtains the acoustic noise model corresponding to the current flight phase of the aircraft 120, converts the analog audio signal to a corresponding digital audio signal, and filters the digital audio signal based on that acoustic noise model to obtain a filtered digital audio signal. The processing system 126 then performs one or more speech recognition techniques and/or algorithms to recognize or otherwise resolve the filtered digital audio signal into one or more words (or terms) in the speech recognition vocabulary (or dictionary). In this manner, the processing system 126 processes the filtered digital audio input signal and executes one or more speech recognition algorithms to identify or otherwise recognize the audio input (or portions thereof) as corresponding to or otherwise matching one or more words in the speech recognition vocabulary. After recognizing the audio input as one or more words in the speech recognition vocabulary and resolving the content of the audio input into its corresponding textual representation, the processing system 126 creates one or more text data objects (e.g., strings, characters, or the like) that correspond to the content of the audio input. The processing system 126 records or otherwise stores the generated text data in the data storage element 138 in a time ordered sequence, as described in greater detail below. In this regard, the processing system 126 may timestamp or otherwise tag the text data with the time at which the corresponding audio input was received.

In an exemplary embodiment, contemporaneously and/or concurrently to receiving the audio input from the audio input device(s) onboard the aircraft, the cockpit voice communication process 200 receives or otherwise obtains real-time flight data and/or information from one or more avioinics systems onboard the aircraft (task 206). In this regard, the obtained flight data and/or information reflects the operation of the aircraft 120 at or around the time the audio input was received. For example, in response to receiving audio input from the audio input device 125, the processing system 126 may obtain, from the navigation system 132 the current position of the aircraft 120 (e.g., the instantaneous latitude, longitude, altitude, heading, and the like). Additionally, the processing system 126 may obtain other flight data and/or information from the FMS 134 or other avionics systems 136 onboard the aircraft 120, such as, for example, the current velocity of the aircraft 120, the current orientation of the aircraft 120 (e.g., roll, pitch, and yaw), the current meteorological conditions proximate the aircraft (e.g., the temperature, pressure, winds, and the like outside the aircraft 120), the current conditions onboard the aircraft 120 (e.g., the cabin pressure, cabin temperature, and the like), the current engine status (e.g., engine cutoff parameters, identification of shutdown and/or inoperable engines), and the like. The processing system 126 records or otherwise stores the obtained flight data in the data storage element 138 in a time ordered sequence, as described in greater detail below. In this regard, the processing system 126 may timestamp or otherwise tag the obtained flight data with the time at which it was received.

In an exemplary embodiment, the cockpit voice communication process 200 continues by storing or otherwise maintaining the text data in association with the obtained flight data that corresponds to the operation of the aircraft at or around the time at which the audio input was received (task 208). For example, in accordance with one embodiment, the processing system 126 associates the text data and flight data by appending the obtained flight data as metadata associated with the text data generated based on audio input received at the time corresponding to the obtained flight data. In this regard, the processing system 126 may combine the text data and the flight data obtained at substantially the same time (e.g., text data and flight data having matching timestamps) into a single data object by utilizing the obtained flight data as a tag or metadata that is associated with the text data. In this manner, the text data objects are stored in the data storage element 138 with their associated flight data (e.g., the flight data having the matching timestamp). As described above, in an exemplary embodiment, the processing system 126 and the data storage element 138 are cooperatively configured to implement an ordered data structure, such as a circular buffer, wherein the text data objects and associated flight data are stored at the logical end of the circular buffer. In this regard, when the circular buffer is full (e.g., the logical end is reached), the most recently generated text data objects are stored by overwriting the least recently generated text data objects in the circular buffer (e.g., by storing the most recent text data and flight data at the entry corresponding to logical beginning of the circular buffer and incrementing the logical beginning and end of the circular buffer such that the entry for most recent text and flight data corresponds to the logical end of the circular buffer). As a result, the contents of the circular buffer correspond to a time-ordered sequence of the most recently generated text data objects and their associated flight data. In another embodiment, the processing system 126 maintains the association between the text data and the concurrent flight data by storing or otherwise maintaining the text data and the concurrent flight data logically adjacent to one another in the circular buffer. For example, using the timestamps of the text data and the flight data, the processing system 126 may order the data sequentially when storing them in the circular buffer maintained by the data storage element 138. In this manner, text data corresponding to audio input received at a first time will be logically adjacent to flight data corresponding to the operation of the aircraft 120 at the first time.

In an exemplary embodiment, the cockpit voice communication process 200 continuously monitors for a transmission triggering event (task 210). In this regard, a transmission triggering event is an occurrence or event that indicates that the stored text data and flight data onboard the aircraft 120 should be transmitted to a ground location. Absent a transmission triggering event, the loop defined by tasks 202, 204, 206, 208, and 210 repeats throughout operation of the aircraft 120 to continuously capture audio input from the audio input device(s) 125 onboard the aircraft 120 and obtain corresponding real-time flight data from the onboard avionics systems 132, 134, 136, convert the captured audio input into text data representative of the received audio, and store the text data and flight data in the data storage element 138 in a time-ordered sequence. In accordance with one or more embodiments, after the aircraft 120 has landed or otherwise ceased operation, the cockpit voice communication process 200 may automatically cease or otherwise terminate operation and the pilot and/or co-pilot may manipulate the user input device 124 to delete the text data and flight data stored in the data storage element 138.

In response to detecting or otherwise identifying a transmission triggering event, the cockpit voice communication process 200 automatically transmits or otherwise communicates the time-ordered sequence of text data and flight data to one or more ground locations (task 212). In accordance with one or more embodiments, the processing system 126 monitors the output of one or more of the avionics systems 132, 134, 136 onboard the aircraft 120 and automatically identifies a transmission triggering event based on the output of one or more of the avionics systems 132, 134, 136. For example, the FMS 134 and/or the onboard avionics 136 may generate a warning or notification (e.g., a stall warning, a ground proximity and/or terrain proximity warning, a traffic collision avoidance system resolution advisory warning, a collision warning, a cabin pressure loss warning, a stick shaker warning, a smoke warning, an aborted take-off notification, or the like) that is received by the processing system 126, wherein in response to receiving the warning from the FMS 134 and/or the onboard avionics 136, the processing system 126 automatically initiates transmission of the text data and flight data stored in the data storage element 138. In an exemplary embodiment, the processing system 126 constructs encrypted data link messages that include the text data and flight data from the circular buffer arranged in time order (e.g., first in, first out), and provides the data link messages to the communications system 130, which, in turn, transmits or otherwise communicates the data link messages to the ground operations center 102 and/or flight tracking station 104. In other embodiments, the processing system 126 may identify a transmission triggering event in response to receiving a user input indicative of a desire to transmit the stored text data and flight data to the ground operations center 102 and/or flight tracking station 104. For example, the processing system 126 may display or otherwise render a graphical user interface element (e.g., button or the like) on the display device 122 adapted to allow a user to initiate transmission of the stored text data and flight data, wherein in response to a user (e.g., a pilot or co-pilot) manipulating the user input device 124 to select the graphical user interface element, the processing system 126 constructs data link messages and provides the data link messages to the communications system 130 for transmission to the ground operations center 102 and/or flight tracking station 104. In yet other embodiments, the processing system 126 may identify a transmission triggering event in response to receiving a request from the ground operations center 102 and/or flight tracking station 104 to transmit the stored text data and flight data. For example, the processing system 112 may display or otherwise render a graphical user interface element on the display device 108 adapted to allow ground personnel at the flight tracking station 104 to transmit a request for the stored text data and flight data to the aircraft 120 via communications system 110. It should be noted that in alternative embodiments, the cockpit voice communication process 200 may be configured to continuously transmit the text data and flight data to a ground location without waiting for a transmission triggering event.

The processing system 112 at the flight tracking station 104 receives and decrypts the data link messages from the aircraft 120 (e.g., via communications system 110), and stores the contents of the data link messages (e.g., the text data and flight data from the data storage element 138) in the data storage element 114. Additionally, the processing system 112 may display or otherwise render a graphical representation of the text data and flight data on the display device 108. In this regard, the processing system 112 displays the text and flight data arranged in a time ordered sequence, such that the text data that was least recently generated by the processing system 126 and its associated flight data is displayed first and followed by the subsequently generated text data and associated flight data, thereby allowing the ground personnel at the flight tracking station 104 to review the contents of the audio captured by the audio input device(s) 125 along with the flight data in a time-ordered manner to better analyze operation of the aircraft 120. In exemplary embodiments, the flight data and text data are graphically associated (e.g., by displaying the flight data and text data having the same timestamp proximate to one another on the display device 108) such that ground personnel can readily ascertain the operational context of the aircraft 120 for the displayed instances of text data.

FIGS. 3-4 depict graphical representations of an ordered data structure 300, such as a circular buffer, that may be stored or otherwise maintained by a data storage element 138 onboard the aircraft 120 in accordance with the cockpit voice communication process 200 described above. As illustrated in FIG. 3, at an initial time $t_0$, the processing system 126 receives audio input from an audio input device 125 and performs speech recognition to convert the received audio input into a corresponding textual representation (text_data_0). The processing system 126 also obtains real-time flight data for the aircraft 120 at time $t_0$ from one or more avionics systems 132, 134, 136 onboard the aircraft 120, such as, for example, the location of the aircraft 120 (aircraft_location_0), the altitude of the aircraft 120 (aircraft_altitude_0), the orientation of the aircraft 120 (aircraft_orientation_0), and the like. As illustrated, the processing system 126 creates an initial entry 302 in the circular buffer that is timestamped (or tagged) with time $t_0$ and includes the corresponding text data and flight data. At a subsequent time $t_1$, the processing system 126 receives a second audio input from an audio input device 125 and performs speech recognition to convert the received audio input into a corresponding textual representation (text_data_1). Again, the processing system 126 also obtains real-time flight data for the aircraft 120 at time $t_1$ and creates an entry 304 in the circular buffer that is timestamped (or tagged) with time $t_1$ and includes the corresponding text data and flight data. As illustrated in FIG. 3, the circular buffer 300 maintains the entries 302, 304 in time order, such that entry 304 follows, and is logically adjacent to, the initial entry 302 corresponding to the preceding audio input.

As illustrated in FIG. 4, after some subsequent time $t_N$, the circular buffer 300 becomes full, wherein when the processing system 126 receives audio input from an audio input device 125 at a subsequent time $t_{N+1}$, the processing system 126 overwrites the initial entry 302 in the circular buffer 300 with the text data and flight data for time $t_{N+1}$ and the entry 304 for time $t_1$ is updated to become the logical beginning of the circular buffer 300 when transmission is initiated. In this regard, when the processing system 126 identifies a transmission triggering event after time $t_{N+1}$, the processing system 126 creates encrypted data link messages representative of the contents of the circular buffer 300 beginning with the contents of the entry 304 corresponding to time $t_1$ and ending with the contents of the entry 302 corresponding to time $t_{N+1}$. When received by the flight tracking station 104, the processing system 112 may display the received text data and flight data on the display device 108, by ordering the text data and flight data for time $t_1$ (e.g., text_data_1, aircraft_location_1, aircraft_altitude_1, aircraft_orientation_1) first and the text data and flight data for time $t_{N+1}$ (e.g., text_data_N+1, aircraft_location_N+1, aircraft_altitude_N+1, aircraft_orientation_N+1) last.

To briefly summarize, one advantage of the subject matter described herein is that by virtue of converting the captured audio into a textual representation before storing and/or transmission, the costs (e.g., amount of storage space required, amount of bandwidth required, time required for transmission) of storing and transmitting the audio information is reduced. Additionally, concurrent (or contemporaneous) flight data and/or information may be obtained and associated with the textual representation of the audio information, thereby providing the operational context of the captured audio to ground personnel reviewing the captured audio information. Providing and storing the captured audio and its associated flight data in a time-ordered sequence separate from the aircraft ensures the captured audio and the operational context for the captured audio will be available independent of the flight data recorder (FDR) and/or cockpit voice recorder (CVR).

For the sake of brevity, conventional techniques related to speech recognition, audio processing and sampling, data structures, data storage, data transmission, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method of communicating information from an aircraft to a computer system at a ground location, the method comprising:
    obtaining an audio input over a period of time from an audio input device onboard the aircraft, the audio input including a plurality of words;
    generating pieces of text data representing the words, wherein each piece of text data is generated at a different time from every other piece of the pieces of text data;
    monitoring for a transmission triggering event;
    storing, in a data structure, each piece of the pieces of text data such that the pieces of text data are stored in the order in which the pieces of text data were generated in a time ordered sequence, wherein the storing includes, if a transmission triggering event has not yet been identified and the data structure is full, overwriting the least recently generated piece of text data in the data structure with the most recently generated piece of text data without communicating the least recently generated piece of text data to the computer system; and if a transmission triggering event is identified, automatically communicating the pieces of text data in the data structure at a time corresponding to the transmission triggering event to the computer system.

2. The method of claim 1, further comprising:

obtaining flight data from an avionics system onboard the aircraft; and associating the flight data with the pieces of text data prior to communicating the pieces of text data.

3. The method of claim 2, wherein:

associating the flight data with the pieces of text data comprises storing the flight data with the pieces of text data in the circular buffer.

4. The method of claim 2, wherein the flight data is obtained concurrently to obtaining the audio input.

5. The method of claim 2, wherein associating the flight data comprises appending the flight data as metadata associated with the pieces of text data.

6. The method of claim 2, wherein communicating the pieces of text data comprises:

creating a data link message including the pieces of text data and the flight data; and transmitting the data link message from the aircraft to the ground location.

7. The method of claim 1, further comprising:

obtaining flight data from an avionics system onboard the aircraft; and communicating the flight data in association with the pieces of text data.

8. The method of claim 7, wherein communicating the flight data in association with the pieces of text data comprises consecutively communicating the flight data and the pieces of text data.

9. The method of claim 1, wherein communicating the pieces of text data comprises communicating the pieces of text data in one or more messages that include the pieces of text data arranged in accordance with the time ordered sequence.

10. The method of claim 1, wherein generating the pieces of text data comprises recognizing the words using a speech recognition vocabulary.

11. The method of claim 10, further comprising filtering the audio input based on an acoustic noise model corresponding to a current operating state of the aircraft prior to recognizing the words.

12. The method of claim 2, further comprising concurrently displaying, by the computer system, the words in graphical association with the flight data.

13. A method of communicating information from an aircraft to a flight tracking station at a ground operations center, the method comprising:

receiving an audio input from an audio input device onboard the aircraft, the audio input including a plurality of words;

converting the audio input to pieces of text data representative of the words, wherein each piece of text data is generated at a different time from every other piece of text data;

obtaining flight data from an avionics system onboard the aircraft;

monitoring for a transmission triggering event;

storing, in a data structure, each piece of the pieces of text data and the flight data such that the pieces of text data are stored in the order in which the pieces of text data were generated, wherein the storing includes, if a transmission triggering even has not yet been identified and the data structure is full, overwriting the least recently generated piece of text data in the data structure with the most recently generated piece of text data without communicating the least recently generated piece of text data to the flight tracking station; and if a transmission triggering event is identified, transmitting, from the aircraft to the flight tracking station, the pieces of text data and the flight data in the data structure at a time corresponding to the transmission triggering event.

14. The method of claim 13, wherein obtaining the flight data comprises obtaining the flight data concurrently to receiving the audio input.

15. The method of claim 13, further comprising associating the flight data with the pieces of text data, wherein transmitting the pieces of text data and the flight data comprises transmitting the flight data with the pieces of text data.

16. A system comprising:

an audio input device onboard an aircraft to receive an audio input comprising a plurality of words;

a processing system coupled to the audio input device to generate pieces of text data representative of the words captured over a period of time, wherein each piece of text data is generated at a different time from every other piece of the pieces of text data;

a data storage element onboard the aircraft and coupled to the processing system; and a communications system coupled to the processing system to communicate the pieces of text data from the aircraft to a ground location;

wherein the processing system is configured to:

monitor for a transmission triggering event;

store each piece of the pieces of text data in the data storage element such that the pieces of text data are stored in the order in which the pieces of text data were generated as a circular buffer, wherein the store the pieces of text data includes, if a transmission triggering event has not yet been identified and the circular buffer is full, overwrite the least recently generated piece of text data in the circular buffer with the most recently generated piece of text data without communicating the least recently generated text data to the communications system; and if a transmission triggering event is identified, send the current pieces of text data in the circular buffer to the communications system for communication to a ground location.

17. The system of claim 16, further comprising an avionics system onboard the aircraft to provide flight data to the processing system, wherein the processing system is configured to associate the flight data and the pieces of text data and communicate the flight data with the pieces of text data.

* * * * *